Sept. 9, 1969                  I. SIMON                3,465,598

DIAMAGNETIC ACCELEROMETER

Filed March 5, 1965                                        2 Sheets-Sheet 1

INVENTOR.
Ivan Simon
BY
Hugh L. Fisher
ATTORNEY

Sept. 9, 1969    I. SIMON    3,465,598
DIAMAGNETIC ACCELEROMETER

Filed March 5, 1965    2 Sheets-Sheet 2

INVENTOR.
Ivan Simon
BY
Hugh L. Fisher
ATTORNEY

United States Patent Office 3,465,598
Patented Sept. 9, 1969

3,465,598
DIAMAGNETIC ACCELEROMETER
Ivan Simon, Belmont, Mass., assignor, by mesne assignments, to General Motors Corporation, Detroit, Mich., a corporation of Delaware
Filed Mar. 5, 1965, Ser. No. 437,402
Int. Cl. G01p *15/08*
U.S. Cl. 73—517                              14 Claims This invention relates to acceleration sensing instruments and more particularly to such instruments in which a body of diamagnetic material is suspended within a magnetic field volume in a manner particularly suitable for use in a single axis accelerometer.

In general, accelerometers, seismometers and the like employ a test mass which is mechanically supported with respect to a reference member so as to have one or more axes of sensitivity to acceleration forces. This mechanical support naturally produces frictional and/or anelastic effects which, in the limit, determine the maximum sensitivity of the instrument. In addition, mechanical displacement restraining means such as springs and the like are generally used to provide an indication of the acceleration forces acting upon the test mass. These mechanical restraining devices are subject to inaccuracies due to material inhomogeneity, aging and other effects which necessitate repeated calibration to maintain highest accuracy. To overcome the frictional and other effects of mechanically supported devices, certain other devices have been proposed wherein a test mass is supported by electromagnetic means. However, since it is well known that naturally stable levitation in a completely paramagnetic system cannot be accomplished, these later devices necessarily employ a complex and expensive feedback control system to maintain the levitation of the test mass.

In accordance with the present invention, a simple and accurate acceleration sensitive apparatus is provided which eliminates the undesirable characteristics of the mechanically supported systems by eliminating the necessity for any sort of mechanical contact with the test mass and which further eliminates the undesirable complexities heretofore necessitated by paramagnetic levitation systems. Further, the present invention provides for the stable levitation of a test mass in a magentic field volume which provides relatively stiff supporting forces and yet which also provides an axis of high sensitivity for the precise determination of inertial effects. This is accomplished by the suspension of a diamagnetic body within a magnetic field volume which is characterized by substantially cylindrical symmetry in which the field intensity increases rapidly with the radial distance from the longitudinal axis of symmetry of the field volume.

As disclosed in United States Patent No. 3,225,608, issued Dec. 28, 1965, in the name of Ivan Simon, and assigned to the assignee of this application, a body of diamagnetic material may be supported in a magnetic field volume characterized by high inhomogeneity of peculiar directional characteristics. Due to this organized inhomogeneity the body is subjected to a force tending to move it in the direction of decreasing field strength. This force is proportional to the product of the gradient of the square of the field strength and the diamagnetic susceptibility of the body.

Applying this principle to the present invention, a substantially cylindrical body of diamagnetic material is suspended in an inhomogeneous field volume having the previously described characteristics of cylindrical symmetry. The diamagnetic body is stably supported within the field volume with the longitudinal axis of the body normally in correspondence with the longitudinal or symmetrical axis of the field volume. In this position the body is radially supported by virtue of the diamagnetic supporting forces which tend to maintain the body in the portion of the field volume of minimum field strength, i.e., along the axis of symmetry, but yet is readily susceptible to displacement to the extent desired in the axial direction. Thus acceleration forces acting on the body in the axial direction can be detected with extreme accuracy in a system which is also relatively uncomplicated and reliable and extremely error free.

In a preferred form of the present invention, the well-known force balance principle of acceleration detection is employed. According to these principles, means are provided to detect displacements of the diamagnetic body along the sensitive axis of the field volume. Further means are provided in an operative relationship with the displacement detecting means to produce external forces for restoring the body to a reference position along the axis. The energy required to perform this restoring function is, of course, related to the acceleration forces tending to displace the body and thus may be taken as a measure of the acceleration forces.

A better appreciation of the invention as well as the particular means for carrying out the invention may be gained from a reading of the following specification which describes various illustrative embodiments and is to be taken with the accompanying drawings of which:

As described above, the invention contemplates the suspension of a diamagnetic body of preferred geometry in an inhomogeneous field volume in which the field intensity is characterized by cylindrical symmetry. This provides a radially supporting field which allows for freedom of displacement to the extent desired along a predetermined axis of sensitivity.

Figure 1:
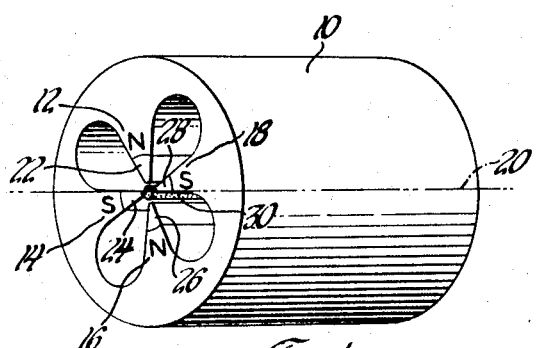
FIGURE 1 is a three-quarter view of a particular means for producing a field volume in accordance with the principles of the present invention.
Figure 2:
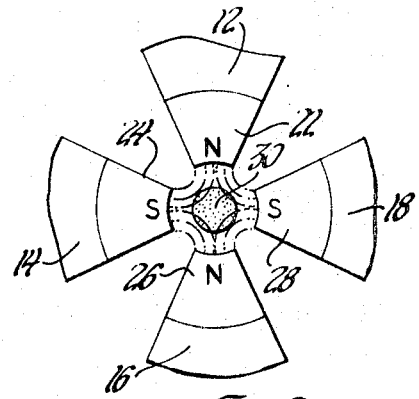
FIGURE 2 is an end view of the field producing means of FIGURE 1 further indicating the position of the test mass with respect to the field.

A particular means for providing such a field is shown in FIGURES 1 and 2 to include a cylindrical permanent magnet 10 which may be cast from a suitable material such as Alnico V. The permanent magnet 10 is formed so as to have four inwardly projecting salient poles 12, 14, 16 and 18. The poles extend longitudinally and are symmetrically and uniformly disposed at 90 degree intervals about the longitudinal axis 20 of the magnet 10 and are of alternately opposite polarity. Accordingly, diametrically opposed poles 12 and 16 are characterized as north poles while poles 14 and 18 are characterized as south poles. The poles 12, 14, 16 and 18 provided with soft magnetic steel pole tips 22, 24, 26 and 28, respectively. These pole tips project radially inward toward the axis 20 but are uniformly spaced apart to define a magnetic field volume possessing the aforementioned characteristics of cylindrical symmetry. As is better shown in FIGURE 2, a diamagnetic body in the form of a cylindrical graphite rod 30 is disposed within the field volume produced by the pole tips 22, 24, 26 and 28 with the longitudinal axis of the rod 30 corresponding to the longitudinal axis 20 of the polar arrangement. As also shown in detail in FIGURE 2, the pole tips 22, 24, 26 and 28 produce a field volume which, as shown by the flux lines extending between the poles of opposite polarity, is characterized by increasing field intensity with increasing radial distance in every direction from the axis 20. Accordingly, a minimum field intensity exists longitudinally along the axis 20 and the graphite rod 30 is stabilized by equal radial forces acting thereon when disposed in the axial position shown in FIGURE 2. It can be seen that any radial displacement from this axial position is accompanied by an increase in the field intensity which increase produces restoring forces on the rod 30 of a magnitude related to the product of the square of the gradient of field strength and the diamagnetic susceptibility of the rod 30. However, due to the relative uniformity of the field intensity along the axis 20, the rod 30 may be freely displaced in the axial direction. Thus axis 20 defines the axis of sensitivity of an acceleration sensing instrument employing the apparatus shown in FIGURES 1 and 2.

The cylindrical rod 30 which, in an accelerometer, represents the test mass is preferably made of purified polycrystalline graphite which has an exceptionally large diamagnetic susceptibility, i.e., approximately $-7 \times 10^{-6}$ e.m.u./gm. Other materials possessing diamagnetic properties such as certain metals, glasses, ceramics and plastics may be used. In addition, it should also be pointed out that while the magnetic field volume is shown in FIGURES 1 and 2 to be produced by a quadrupole permanent magnet, it is apparent that electromagnetic means may also be employed to produce the field volume. Hence, while the term "magnetic" field volume is used throughout this specification, it is to be understood that the term magnetic also embraces electromagnetically generated fields.

Figure 3:
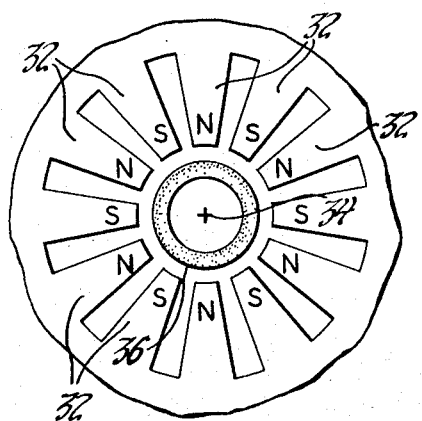
FIGURE 3 is an end view of an alternative means for generating a field volume in accordance with the present invention and also showing an alternative form of the diamagnetic body supported thereby.

The particular configuration of the field producing apparatus and the diamagnetic body may be varied in accordance with certain practical considerations. For example, a greater number of poles than four may be used as shown in FIGURE 3. In this alternative embodiment, twelve elongated salient poles 32 are cylindrically arranged about an axis of symmetry 34 in alternately opposite polarity which produce a cylindrically symmetrical magnetic field volume having the desired characteristic of increasing radial field intensity. The relatively large number of poles used in the configuration of FIGURE 3 causes the region of highest field gradient to be localized near the poles, and therefore the maximum supporting force is generated at a greater radial distance from axis 34 than is true of the quadrupole configuration shown in FIGURES 1 and 2. Accordingly, a hollow graphite rod 36 may be more advantageously used with the relatively greater number of poles shown in FIGURE 3.

Figure 4:
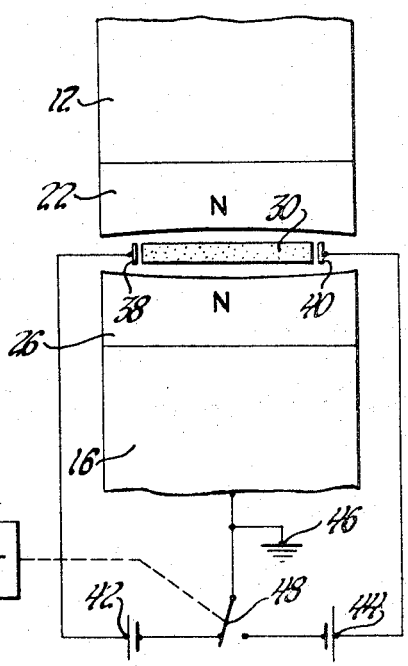
FIGURE 4 is a cross-sectional side view of the supporting apparatus shown in FIGURE 1 with the addition of a schematic representation of electrostatic forcing apparatus.

It will be apparent to those skilled in the art that while the supporting field produced by the physical apparatus shown in FIGURES 1–3, is relatively uniform in the axial direction, a fringing effect produces a relatively slight decrease in field intensity toward the outer axial extremities of the pole pieces. Since it has been established that the diamagnetic body tends to move in the direction of decreasing field intensity, it follows that the graphite rod 30 as shown in FIGURES 1 and 2 would be subjected to slight axial forces tending to displace the rod axially out of the polar arrangement. This can be compensated for by making the axial dimension of the poles very large compared to the axial length of the rod 30 so that fringing is of no consequence. However, a more practical approach is to form the pole tips 22, 24, 26 and 28 so as to have a shallow axial concavity. This concavity may be such as to slightly increase the field intensity toward the axial extremities of the pole tips so as to produce a relatively small axial gradient tending to maintain the graphite rod 30 in an axially central reference position within the pole tips. The axial concavity to compensate for fringing or end effects is shown in FIGURE 4 in which each of the pole tips 22 and 26 are very slightly concave in the axial direction. It is, of course, to be understood that the south pole pieces 24 and 28 are similarly shaped.

It is to be noted that the pole tips 22, 24, 26 and 28 are also formed, as shown in FIGURE 2, to have a slight circumferential concavity tending to expose the greatest surface area to the rod 30 at a uniform distance therefrom.

As previously discussed, a preferred form of accelerometer employs the force balance principle carried out by means for detecting a displacement of the test mass relative to the surrounding reference members and means responsive to this displacement to apply an external force upon the test mass of a magnitude which is calculated to return the test mass to a reference position. Applying this principle to the accelerometer apparatus shown in FIGURE 4, it is desirable to apply axial restoring forces on the test mass which, in this case, is the graphite rod 30 which tends to maintain the rod 30 in the central reference position shown. Preferably, these forces must be produced without physical contact with the test mass 30. In the present embodiment these axial restoring forces are produced electrostatically by a combination of control electrodes 38 and 40 which are disposed adjacent the axial ends of the rod 30 and in planes parallel to the end planes of the rod 30. Since acceleration forces may be applied in either axial direction to the graphite rod 30, the restoring forces must also be bidirectional. Accordingly, the use of two electrodes is necessitated. Electrode 38 is connected to a first voltage source 42 which maintains electrode 38 at a predetermined voltage. Electrode 40 is connected to a second voltage source 44 which similarly maintains electrode 40 at a predetermined voltage. The surrounding pole tips 22 and 26 and the magnetic poles 12 and 16 constitute the ground electrode of the electrostatic system and are accordingly grounded as indicated at 46. A controlled switch 48 is provided to be positioned in accordance with signals from a displacement sensitive control means 49. Depending on the position of switch 48, an electrostatic circuit is completed to one of the control electrodes 38 or 40 to apply an electrostatic restoring force to the rod 30 in the proper direction.

When the controlled switch 48 applies a voltage to one of the control electrodes, the rod 30 assumes a potential which is intermediate the predetermined potential of the voltage source and ground. The attractive force tending to restore the rod 30 to the reference position is then directly proportional to the square of the potential between the rod 30 and the energized control electrode and inversely proportional to the square of the distance between the rod and the control electrode. By judicious choice of the controlled or predetermined voltages of sources 42 and 44 and the gap distance between the rod 30 and the control electrodes 38 and 40, it is possible to obtain a controlling force of the desired magnitude. The capacitance between the test mass 30 and the control electrode is also proportional to the dielectric constant of the medium between them. Therefore, in an accelerometer employing a damping fluid in the field volume between the poles, it may be desirable to use a fluid having a high value dielectric constant such as nitrobenzene. This liquid must also be of high purity and excellent insulating quality in order to withstand the electric stress without breaking down.

It has also been found that the diagrammatic effect of the rod 30 may be enhanced by immersion in a medium of paramagnetic susceptibility. Solutions of salts of various transition element group metals or rare earths may be used. Thus it may also be desirable to use a paramagnetic damping fluid. The end choice will depend upon practical considerations involved in the specific application of the invention.

It is to be understood that various other means may be employed to produce restoring forces on the graphite rod 30. For example, an electromagnetic system for producing the restoring forces may include non-magnetic means such as glass rods extending axially outward from the test mass rod 30 beyond the axial extremities of the pole tips and having small iron tips fastened thereon. Solenoid means may be stationed adjacent the iron tips to produce axial forces on the rod 30. Alternatively, when the graphite rod 30 of the accelerometer is immersed in a damping fluid, it is possible to transfer momentum to the rod by making use of the fluid medium. Various types of miniaturized electromagnetic or magnetohydrodynamic pumps may be employed as will be apparent to those skilled in the art. A still further forcing system may use means such as an ultrasonic transducer for projecting concentrated sound waves upon the end planes of the rod 30. Other modifications will occur to those skilled in the art.

Figure 5:
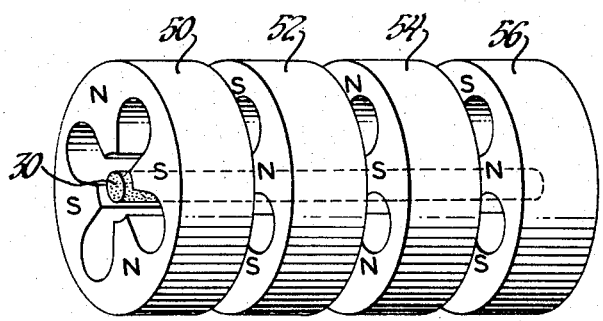
FIGURE 5 shows another alternative form for the field producing apparatus.

Should it be impractical to use a damping fluid, FIGURE 5 shows an alternative method of obtaining damping by means of eddy currents induced in the test mass. In FIGURE 5 the field volume is produced by four similar quadrupole permanent magnets 50, 52, 54 and 56. Each of the magnets is similar to the others with four radially inwardly projecting salient poles as shown in FIGURE 1. However, the magnets are of lesser axial dimension so as to form what may be termed a laminated stack of magnets. The graphite rod 30 projects axially through the laminated arrangement as indicated in FIGURE 5. Each of the magnets is rotated 90 degrees from the adjacent magnets such that a north pole of magnet 50 is aligned with the south pole of magnet 52, and so on. Since graphite is a fairly good electrical conductor, movement of the rod 30 induces eddy currents in the rod tending to oppose the motion of displacement. This effect may be enhanced by plating the surface of the graphite rod 30 with highly conductive material such as copper or silver.

Figure 6:
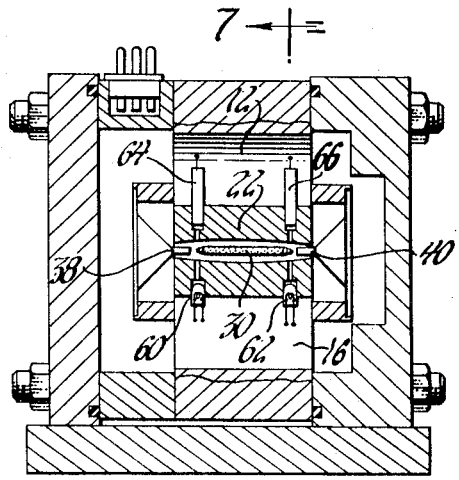
FIGURE 6 is a side view of an illustrative embodiment of the invention indicating a particular form of displacement detection means.
Figure 7:
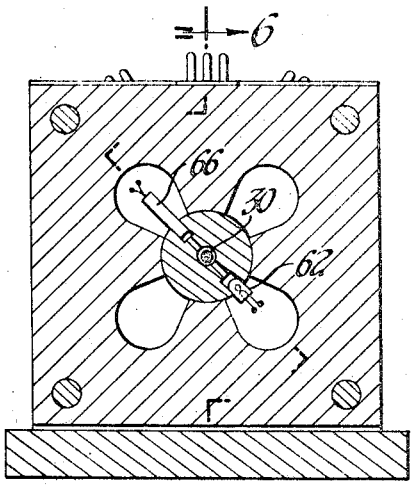
FIGURE 7 is a front sectional view of the apparatus shown in FIGURE 6 taken along section lines 7—7.
Figure 8:
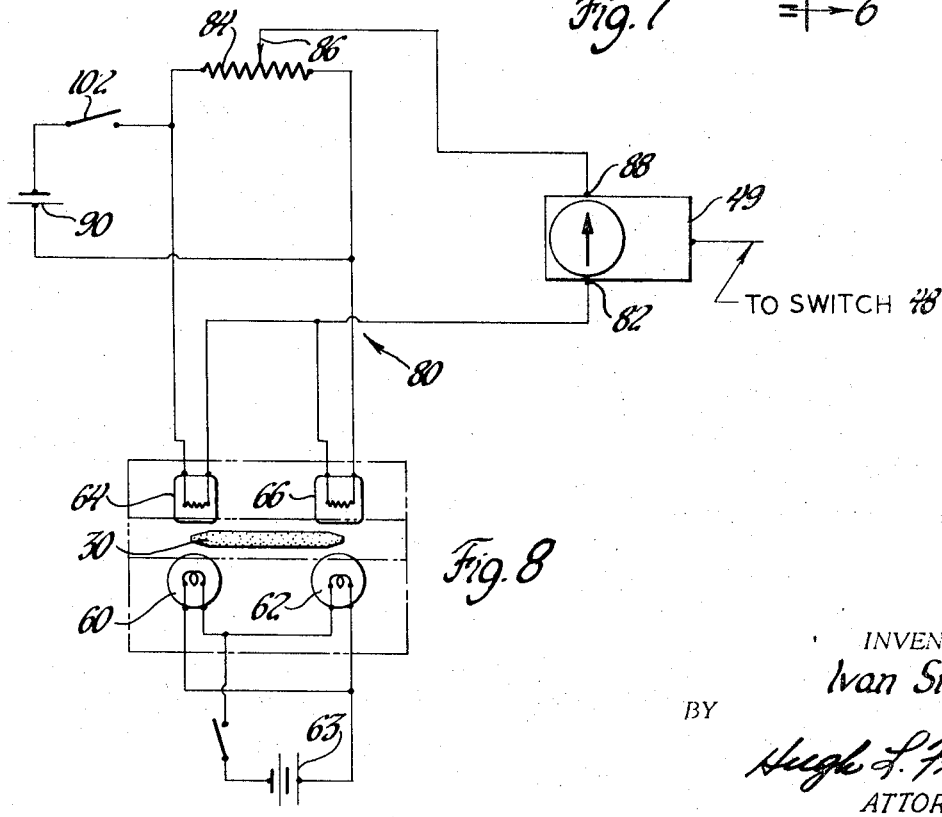
FIGURE 8 is a schematic diagram of the displacement detection circuitry.

Referring to FIGURES 6, 7 and 8, an optical displacement detecting system is shown. This system is adapted to detect the direction and magnitude of axial displacement of the graphite rod 30 relative to the surrounding pole pieces. As shown in FIGURES 6 and 7, a pair of lamps 60 and 62 are disposed adjacent respective ends of the graphite rod 30 so as to direct light transversely across the field volume; that is, perpendicular to the axis of sensitivity. The lamps may be energized by a source 63 shown in FIGURE 8. Located opposite the lamps 60 and 62 are photoresistors 64 and 66, respectively. These photoresistors are responsive to the quantity of light received from the associated lamp to produce an electrical signal of a voltage indicating the quantity of light being received. The ends of the rod 30 may be tapered to improve the displacement linearity of the system.

When the graphite rod 30 is disposed in a reference position, the position of the lamps 60 and 62 as well as the associated photoresistors 64 and 66 is such that the photoresistors receive equal amounts of light. However, axial displacement of the test mass 30 tends to shade one or the other of the photoresistors thus decreasing the amount of light received by one and increasing the amount of light received by the other. This optical imbalance is manifested by an electrical imbalance between the signals received from the photoresistors 64 and 66.

As shown in FIGURE 8, the photoresistors 64 and 68 may be connected into a bridge circuit 80. In this circuit, one side of each of the photoresistors 64 and 66 is connected to an input terminal 82 of a null type control unit 49. The other side of the photoresistors is connected across a resistor 84. A sliding contact 86, which may be adjusted for calibration purposes, is connected to the other input terminal 88 of the control unit 49. A voltage source 90 is connected by means of a switch 102 across the resistor 84 to produce a potential thereacross. Accordingly, the polarity and magnitude of the input voltage to control unit 49 varies with the direction and extent of displacement of rod 30 with respect to the photoresistors 64 and 66. The control unit 49 may be operatively connected to the switch 48 to control the restoring force applied to the rod 30 according to the displacement detected.

While the invention has been described with reference to specific embodiments thereof it is to be understood that these embodiments are merely illustrative and are not to be construed in a limiting sense. For a definition of the invention reference should be had to the appended claims.

I claim:

1. An instrument of the class described comprising means for producing a substantially cylindrical magnetic field volume having a longitudinal axis of symmetry and being characterized by relatively rapidly increasing field intensity with radial distance from the axis and relatively constant axial intensity, and an elongated body of nonconductive diamagnetic material disposed within the field volume and coaxial therewith and radially supported by the field.

2. An instrument as defined in claim 1 further including means for detecting axial displacements of the body relative to the volume and for producing signals related thereto.

3. An instrument as defined in claim 2 further including force producing means connected to receive the displacement signals and responsive thereto to produce forces resisting axial displacements of the body.

4. An instrument of the class described comprising means for producing a substantially cylindrical magnetic field volume having a longitudinal axis of symmetry and being characterized by a relatively slowly increasing intensity with increasing axial distance from a midpoint of the volume and a relatively rapidly increasing intensity with increasing radial distance from the axis, and a substantially cylindrical body of nonconductive diamagnetic material disposed within the field volume and coaxial therewith whereby the force resisting radial displacement of the body relative to the volume substantially exceeds the force resisting axial displacement.

5. An instrument as defined in claim 4 further including means for detecting axial displacements of the body relative to the volume and for producing signals related thereto.

6. An instrument as defined in claim 5 further including force producing means responsive to the displacement signals to produce forces resisting axial displacement of the body.

7. Accelerometer apparatus comprising a plurality of elongated magnetic poles symmetrically disposed about a longitudinal axis in alternatingly opposite polarity to define a substantially cylindrical magnetic field volume the field intensity of which increases relatively rapidly with radial distance from the axis, and a substantially cylindrical body of nonconductive diamagnetic material disposed within the volume and coaxial therewith, the axial length of the body being less than the axial length of the poles.

8. Apparatus as defined in claim 7 further including means for detecting axial displacements of the body relative to the poles and for producing signals related thereto, and means connected to receive the signals for producing forces on the body in opposition to the axial displacements.

9. A single axis accelerometer comprising four elongated magnetic poles symmetrically and uniformly disposed about a longitudinal axis in alternatingly opposite polarity to define a substantially cylindrical magnetic field volume the intensity of which increases relatively rapidly with radial distance from the axis, and a substantially cylindrical body of nonconductive diamagnetic material suspended within the volume and coaxial therewith, the axial length of the body being less than the axial length of the poles.

10. An accelerometer as defined in claim 9 further including displacement detecting means for producing signals related to the axial displacements of the body relative to the poles, and forcer means connected to receive the signals for producing axially-acting forces on the body resisting axial displacement thereof.

11. An accelerometer as defined in claim 10 wherein each of the magnetic poles exhibits a shallow axial concavity.

12. An accelerometer as defined in claim 11 wherein the diamagnetic body is a cylindrical graphite rod, and the displacement detecting means comprises a pair of lamps disposed adjacent the ends of the rod when in a reference position for directing light transversely to the longitudinal axis, a pair of photosensitive devices disposed opposite the lamps for receiving light therefrom except when shaded by the rod, and means for producing signals indicating the relative magnitudes of light received by said devices.

13. An accelerometer as defined in claim 11 wherein the diamagnetic body is a cylindrical graphite rod, and the forcer means comprises a pair of electrodes disposed adjacent opposite ends of the rod, means for selectively applying a voltage to either of the electrodes and means for grounding at least one of the poles thereby to provide a capacitive circuit through and including the rod producing electrostatic forces in a selected axial direction.

14. An accelerometer as defined in claim 11 including a paramagnetic damping fluid surrounding the body.

References Cited

UNITED STATES PATENTS

| | | | |
|---|---|---|---|
| 3,175,405 | 3/1965 | Doyle et al. | 73—517 |
| 3,225,608 | 12/1965 | Simon | 74—5.6 |
| 3,261,210 | 7/1966 | Buckhold | 73—517 |
| 3,358,945 | 12/1967 | Blount et al. | 308—10 XR |

OTHER REFERENCES

"Superconducting Suspension for a Sensitive Accelerometer," by Chapman et al., from "The Review of Scientific Instruments," vol. 36, No. 1, p. 96, January 1965.

JAMES J. GILL, Primary Examiner

U.S. Cl. X.R.

308—10